US012406567B2

(12) United States Patent
Patel et al.

(10) Patent No.: US 12,406,567 B2
(45) Date of Patent: Sep. 2, 2025

(54) ELECTRICAL POWER LINE MOUNTED FIRE WARNING SYSTEM

(71) Applicant: LINDSEY FIRESENSE, LLC, Azusa, CA (US)

(72) Inventors: Jagdishbhai U. Patel, Granada Hills, CA (US); David Q. Zhu, North Hills, CA (US)

(73) Assignee: Lindsey Firesense, LLP, Azusa, CA (US)

( * ) Notice: Subject to any disclaimer, the term of this patent is extended or adjusted under 35 U.S.C. 154(b) by 0 days.

(21) Appl. No.: 16/858,506

(22) Filed: Apr. 24, 2020

(65) Prior Publication Data

US 2020/0342744 A1 Oct. 29, 2020

Related U.S. Application Data

(60) Provisional application No. 62/837,851, filed on Apr. 24, 2019.

(51) Int. Cl.
*G08B 25/06* (2006.01)
*G08B 17/06* (2006.01)
(Continued)

(52) U.S. Cl.
CPC ............. *G08B 25/06* (2013.01); *G08B 17/06* (2013.01); *G08B 17/10* (2013.01); *G08B 17/12* (2013.01)

(58) Field of Classification Search
CPC ........ G08B 25/06; G08B 17/10; G08B 17/06; G08B 17/12
(Continued)

(56) References Cited

U.S. PATENT DOCUMENTS 5,892,430 A * 4/1999 Wiesman .......... H02J 13/00002 361/93.6
7,123,154 B1 * 10/2006 Smith .................... G08B 17/12 340/506
(Continued)

FOREIGN PATENT DOCUMENTS

KR 10-2009-0050672 5/2009
KR 10-1040732 6/2011
(Continued)

OTHER PUBLICATIONS

International Search Report for corresponding International Application No. PCT/US 20/29962, filed Apr. 24, 2020, International Search Report mailed Jul. 21, 2020 (2 pgs.).
(Continued)

*Primary Examiner* — Daryl C Pope
(74) *Attorney, Agent, or Firm* — Womble Bond Dickinson (US) LLP

(57) ABSTRACT

An electrical power line mounted fire warning system and a method of monitoring and providing a fire warning using the same are provided. An electrical power line mounted fire warning system includes: a plurality of sensor nodes, each including a housing mountable on an electrical power line, a plurality of sensors supported by the housing and including an IR sensor and/or a bolometer to detect a fire, and optionally including an electromagnetic sensor to detect at least one of a spark, a current surge of the electrical power line, or a line short of the electrical power line, a microcontroller configured to determine existence of a fire or a fire risk based on one or more parameters detected by the plurality of sensors, and a communication device.

37 Claims, 8 Drawing Sheets

(51) Int. Cl.
*G08B 17/10* (2006.01)
*G08B 17/12* (2006.01)

(58) Field of Classification Search
USPC .................................. 340/539, 539.1, 539.11
See application file for complete search history.

(56) References Cited

U.S. PATENT DOCUMENTS

| | | | | |
|---|---|---|---|---|
| 9,276,399 | B2 * | 3/2016 | Sales Casals | H04Q 9/00 |
| 9,970,975 | B2 * | 5/2018 | Bango | G01R 15/186 |
| 2002/0011570 | A1 | 1/2002 | Castleman | |
| 2004/0053435 | A1 * | 3/2004 | Ikushima | B81B 3/0072 438/57 |
| 2012/0229283 | A1 * | 9/2012 | McKenna | G08B 25/10 340/584 |
| 2014/0278150 | A1 | 9/2014 | Baesler et al. | |
| 2015/0288745 | A1 | 10/2015 | Moghaddam et al. | |
| 2016/0127878 | A1 * | 5/2016 | Clarke | H04W 4/021 705/324 |
| 2018/0165484 | A1 * | 6/2018 | Liu | H04B 5/0062 |
| 2018/0239991 | A1 * | 8/2018 | Weller | G06F 17/18 |
| 2019/0108738 | A1 | 4/2019 | Al Hajjaj | |

FOREIGN PATENT DOCUMENTS

| | | | | |
|---|---|---|---|---|
| KR | 20170123295 | A | * | 11/2017 |
| WO | WO 2017/217977 | A1 | | 12/2017 |

OTHER PUBLICATIONS

Written Opinion of the International Searching Authority for corresponding International Application No. PCT/US 20/29962, filed Apr. 24, 2020, Written Opinion of the International Searching Authority mailed Jul. 21, 2020 (14 pgs.).
Australian Patent Office Examination Report issued in corresponding Australian Patent Application No. 2020263584 on Oct. 4, 2022, 6 pages.
Extended European Search Report dated Dec. 20, 2022 issued in corresponding European Application No. 20794538.7.

* cited by examiner

TRANSMISSION LINE SAG

ELECTRICAL POWER LINE MOUNTED FIRE WARNING SYSTEM

CROSS-REFERENCE TO RELATED APPLICATION

This application claims the benefit of U.S. Provisional Patent Application Ser. No. 62/837,851, filed on Apr. 24, 2019, the entire disclosure of which is hereby incorporated by reference.

STATEMENT REGARDING FEDERALLY SPONSORED RESEARCH OR DEVELOPMENT

This invention was made with government support under Contract No. 80NM0018D004 awarded by the National Aeronautics and Space Administration (NASA). The government has certain rights in the invention.

FIELD

Aspects of embodiments of the present invention relate to an electrical power line mounted fire warning system, and a method of monitoring and providing a fire warning using the same.

BACKGROUND

High voltage electrical power systems were found responsible for causing most of the major recent wildfires (in last six years) in California, leading to a loss of close to a hundred lives, destruction of billions of dollars of properties and homes, and disruption of life. Power companies are facing law suits to pay for these losses. As such, there is a need for extremely reliable technology to provide early detection of such fires in the future, especially when fire conditions prevail under dry and windy condition in hot weather. Early detection provides fire fighting responders a smaller fire to attack. Very limited solutions are currently available for persistently monitoring the area around power lines for fires day and night. Available solutions are limited to visual monitoring from remotely controlled high power cameras or from satellites. The former is limited in usefulness as the detection size of fires must increase with the distance of the cameras. Satellite imagery is usually provided only on a periodic basis as the satellite passes overhead.

Further, those solutions, even when employed, are not fully efficient in early detection of fires as realized recently, at the cost of over 80 human lives during the Camp fire. New low-cost technology solutions, which could be readily deployed in wide areas on power lines, are needed.

SUMMARY

According to an aspect of embodiments of the present invention, an electrical power line mounted fire warning system may provide early or prompt/immediate warning of power line faults, any fires which may have just occurred, and any other fires close by, which may have been caused by other sources.

According to another aspect of embodiments of the present invention, a low-cost, easily implemented and deployable, monitoring and early warning sensor system may be snapped onto or supported at the lowest point of an arch or the lowest hanging high voltage power cable in remote areas could prevent wildfires during hot, dry, and windy conditions, as accumulation of dry vegetation may be ready fuel for such fires to occur in an instant, when a fault occurs on the power line. The sensing system may be implemented on the lowest hanging cable's lowest arch, on the power poles, and by transformers, which could heat up and cause fire in extreme summer fire conditions.

According to another aspect of embodiments of the present invention, an electrical power line mounted fire warning system may monitor any sparking, arcing, large current surges, and/or instantaneous current direction changes.

According to another aspect of embodiments of the present invention, an electrical power line mounted fire warning system may compare a fault magnitude with a specified range to determine the existence of an electrical fault and corresponding actual fire danger.

According to another aspect of embodiments of the present invention, an electrical power line mounted fire warning system may, in high wind conditions, monitor swings on the electrical power line using an accelerometer for early warning of fire ignition danger.

According to another aspect of embodiments of the present invention, an electrical power line mounted fire warning system may detect a fire under the electrical power line arising from other sources using an IR detector and/or bolometers integrated in the device.

According to another aspect of embodiments of the present invention, an electrical power line mounted fire warning system may process data fusion from a plurality of sensors to determine a type of warning, and generate a warning signal to communicate combined with location ID and fault event or potential danger.

According to another aspect of embodiments of the present invention, an electrical power line mounted fire warning system may continue sending a warning signal periodically over the electrical power line until acknowledged from the listening end, and may be capable of sending the signal via a cell tower or a satellite or other form of electromagnetic field communication.

According to one or more embodiments of the present invention, an electrical power line mounted fire warning system includes: a plurality of sensor nodes, each including a housing mountable on an electrical power line, a plurality of sensors supported by the housing and including an IR sensor to detect a fire and/or a bolometer to detect the heat from a fire, a microcontroller configured to determine existence of a fire or a fire risk based on one or more parameters detected by the plurality of sensors, and a communication device configured to send a signal away from the sensor node when the microcontroller determines existence of a fire or a fire risk.

Each of the plurality of sensor nodes may further comprise an electromagnetic sensor to detect at least one of a spark, a current surge of the electrical power line, or a line short of the electrical power line.

Each of the plurality of sensor nodes may further include a camera.

The plurality of sensors may further include a temperature sensor.

The plurality of sensors may further include an accelerometer.

The plurality of sensors may further include an EM sensor to detect at least one of a spark, a current surge of the electrical power line, or a line short of the electrical power line The electrical power line mounted fire warning system may further include a monitoring station, and the communication device may be configured to send the signal to the monitoring station.

The communication device may be configured to send the signal to a neighboring sensor node of the plurality of sensor nodes, and the neighboring sensor node may be configured to receive the signal.

Each of the plurality of sensor nodes may be configured to be powered from the electrical power line.

The plurality of sensors may further include a humidity sensor.

The plurality of sensors may further include a light sensor.

The plurality of sensors may further include a smoke detector.

According to one or more embodiments of the present invention, a method of monitoring and providing a fire warning includes: providing a plurality of sensor nodes, each including: a housing mountable on an electrical power line; a plurality of sensors supported by the housing and including: an IR sensor and/or bolometer to detect a fire; a microcontroller configured to determine existence of a fire or a fire risk based on one or more parameters detected by the plurality of sensors; and a communication device configured to send a signal away from the sensor node when the microcontroller determines existence of a fire or a fire risk; and mounting the plurality of sensor nodes on one or more electrical power lines.

Each of the plurality of sensor nodes may further comprise an electromagnetic sensor to detect at least one of a spark, a current surge of the electrical power line, or a line short of the electrical power line.

The communication device may send the signal to a monitoring station when the microcontroller determines existence of a fire or a fire risk.

The communication device may send the signal to a neighboring sensor node of the plurality of sensor nodes when the microcontroller determines existence of a fire or a fire risk, and the neighboring sensor node may receive the signal.

One of more of the plurality of sensor nodes may be mounted on the electrical power line at a lowest point of an arch of the electrical power line.

When the microcontroller determines existence of a fire or a fire risk, the communication device may send the signal until acknowledged from a listening end.

When the microcontroller determines existence of a fire or a fire risk, the communication device may send the signal along the electrical power line.

According to one or more embodiments of the present invention, a sensor device includes: a housing mountable on an electrical power line; a plurality of sensors supported by the housing and comprising: an IR sensor and/or bolometer to detect a fire; a microcontroller configured to determine existence of a fire or a fire risk based on one or more parameters detected by the plurality of sensors; and a communication device configured to send a signal away from the sensor node when the microcontroller determines existence of a fire or a fire risk.

The plurality of sensors may further comprise an electromagnetic sensor to detect at least one of a spark, a current surge of the electrical power line, or a line short of the electrical power line.

BRIEF DESCRIPTION OF THE DRAWINGS

The above and other features, aspects, and advantages of the present invention will become better understood with regard to the following description and accompanying drawings where.

DETAILED DESCRIPTION

In the following description, certain example embodiments of the present invention are shown and described, by way of illustration. As those skilled in the art would recognize, the described example embodiments may be modified in various ways without departing from the spirit and scope of the present invention. Accordingly, the drawings and description are to be regarded as illustrative in nature, rather than restrictive.

Figure 1:
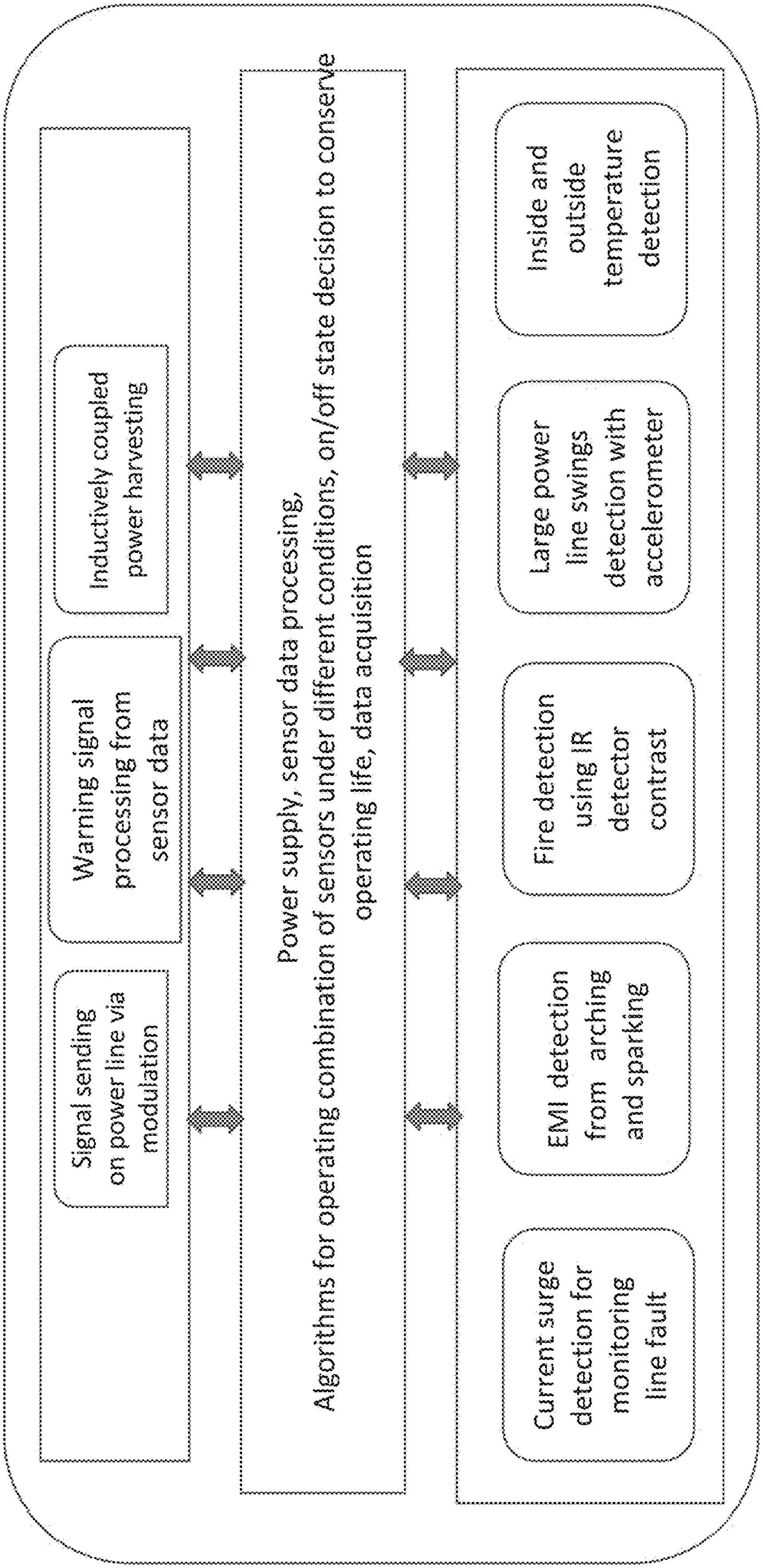
FIG. 1 is a schematic functional flow diagram of an electrical power line mounted fire warning system, according to an embodiment of the present invention.
Figure 2:
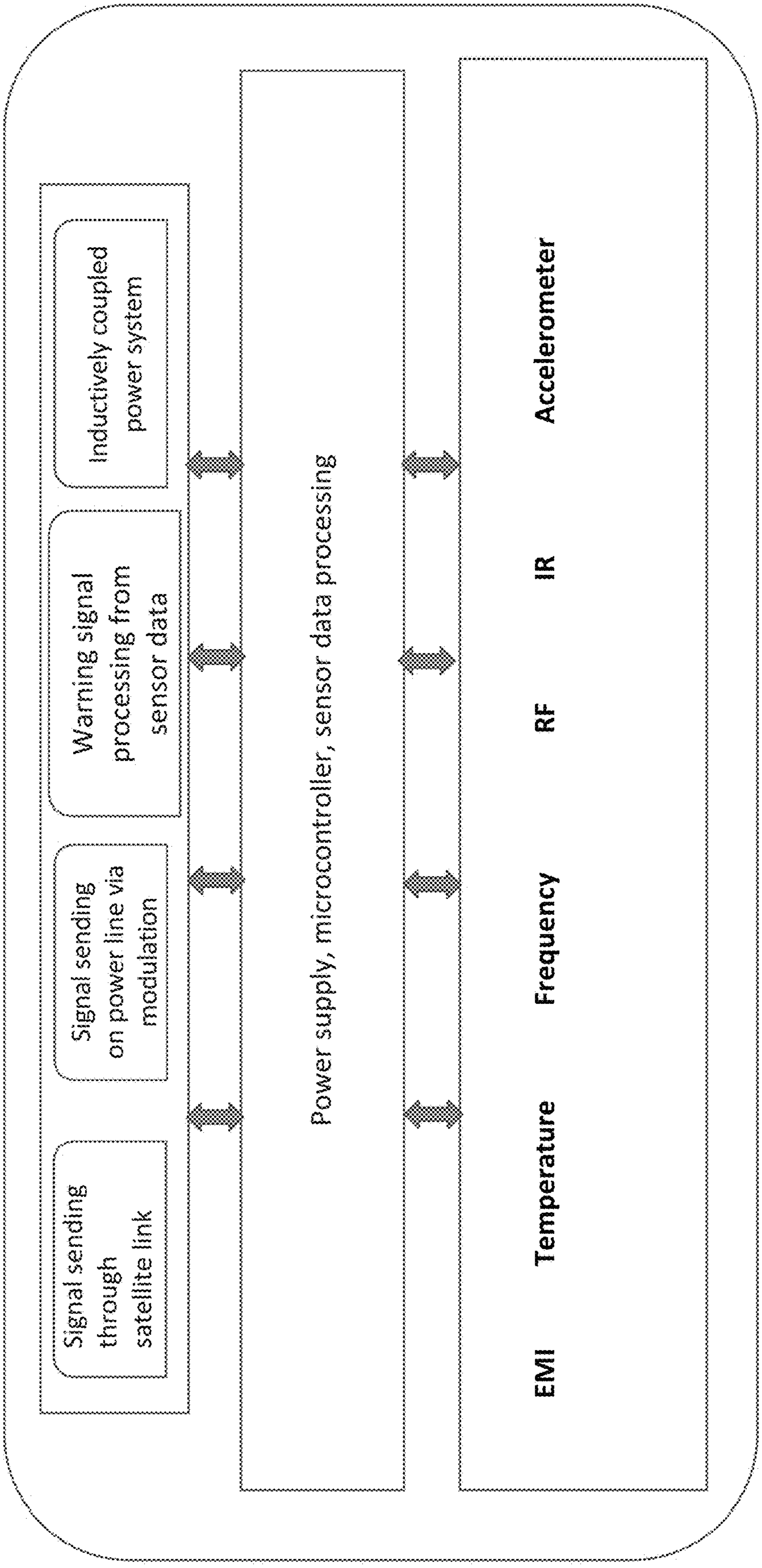
FIG. 2 is a schematic diagram of an electrical power line mounted fire warning system including some sensors, according to an embodiment of the present invention.
Figure 3:
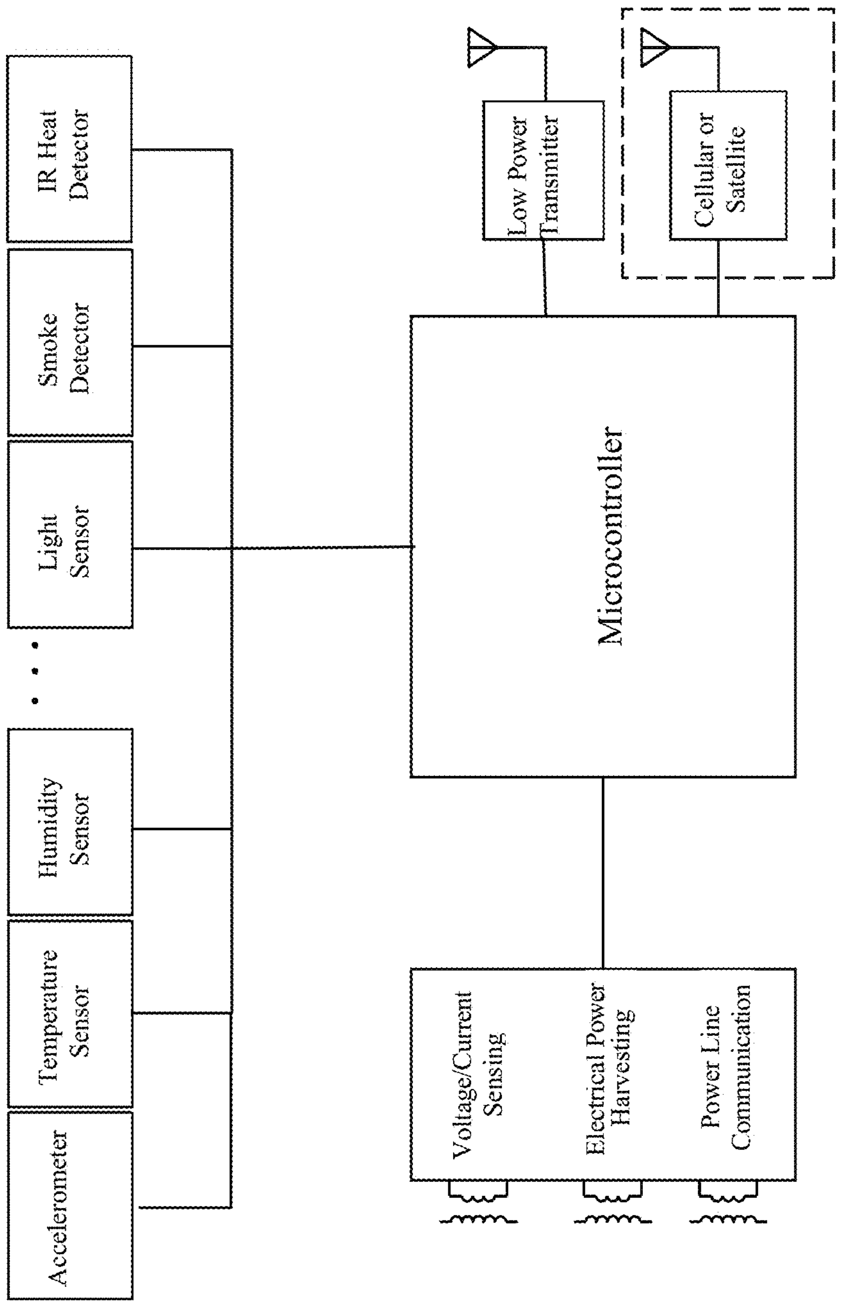
FIG. 3 is a schematic diagram of an electrical power line mounted fire warning system including some sensors, according to an embodiment of the present invention.
Figure 4:
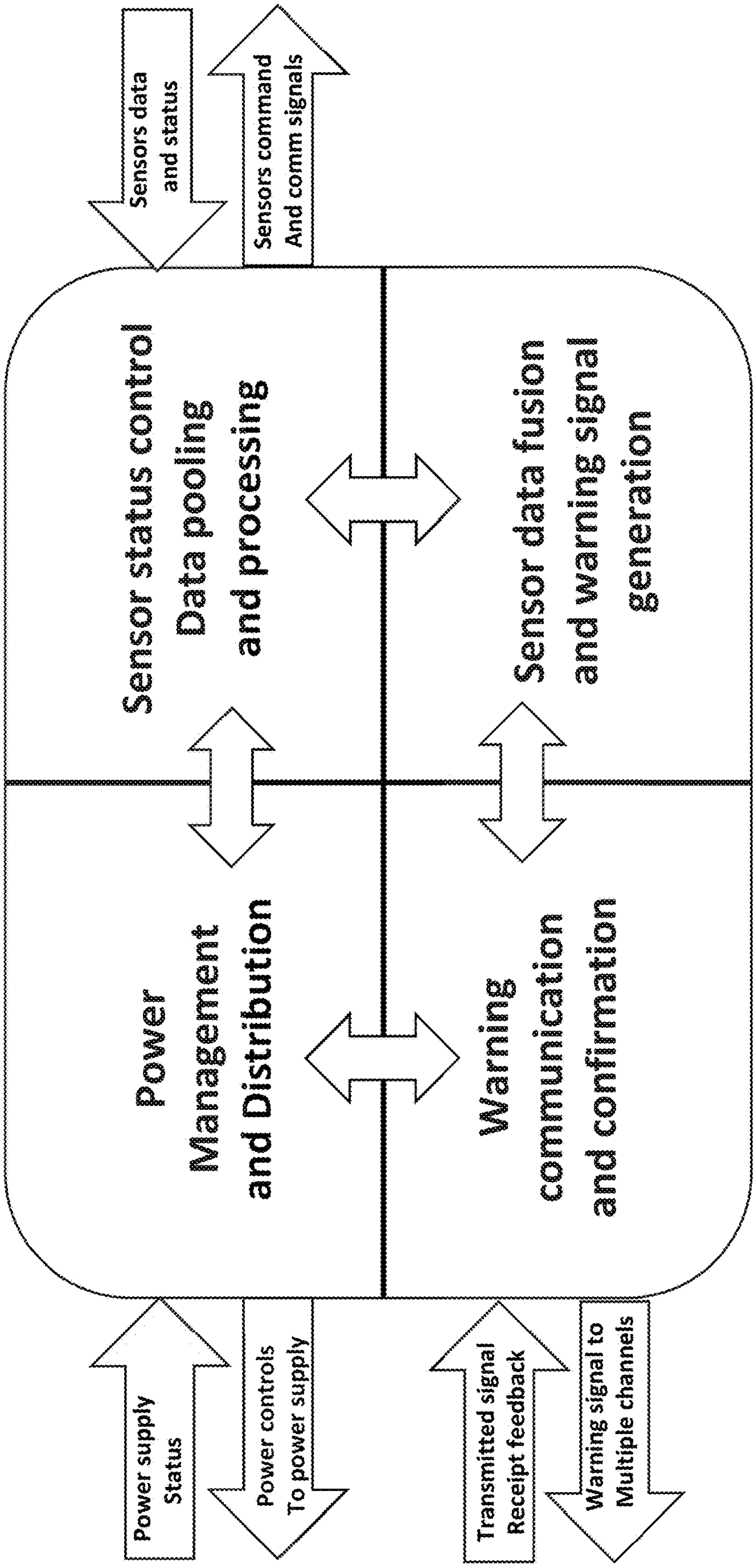
FIG. 4 is a schematic diagram illustrating functionality of a microcontroller of an electrical power line mounted fire warning system, according to an embodiment of the present invention.

FIG. 1 is a schematic functional flow diagram of an electrical power line mounted fire warning system, according to an embodiment of the present invention. FIGS. 2 and 3 are schematic diagrams of an electrical power line mounted fire warning system including some sensors, according to one or more embodiments of the present invention. FIG. 4 is a schematic diagram illustrating functionality of a microcontroller of an electrical power line mounted fire warning system, according to an embodiment of the present invention.

With reference to FIGS. 1 to 4, an electrical power line mounted fire warning system according to embodiments of the present invention is configured to execute multiple sensory functions, data analysis, data fusion, and determination of fire existence and fire danger level, followed by sending a signal to authorities via multiple channels within moments of the fire occurrence or severe potential fire condition. The system may act within a very short and critical time window in which authorities can shut down the power and fight the fire, such as with aerial platforms, while the fire is still small and manageable. The system may also warn power line operators of electrical faults and/or fires burning dose to power lines and poles, in order to prevent further damage to the power grid.

The electrical power line mounted fire warning system according to embodiments of the present invention may include numerous sensor nodes distributed along power transmission lines functioning as a distributed sensor network, and with sensor fusion provide decision making for fire detection and potential fire conditions, and communication of warning signals over multiple available channels. Further, the system may be configured having high overall system robustness, reliability, testability, and maintainability via redundancy and fault tolerance.

The electrical power line mounted fire warning system according to embodiments of the present invention employs a variety of complementary sensors, enabling data fusion to avoid false alarms. When fire conditions, such as high winds, extreme low humidity, and high temperatures jointly prevail, the system may predict fire danger before a fire occurs. Under high-wind conditions, 3-d accelerometers may be used to provide warning about wide swings of power cables in remote areas, which could potentially cause fire. Current surge and EMI/ESD monitors can detect early sparks and arching before a fire has started. Early warning will provide a critical time window for responders for a quick control before a fire occurs or at least while a fire is still manageable. Continuous automated monitoring in wide areas during fire seasons will help avoid fires from starting, and provide early detection of fires to allow firefighting resources additional time to prevent them from growing out of control.

According to embodiments, IR and temperature sensors may detect nearby fires arising from power lines and other sources, which may avoid damage to the power lines from fires close by. As such, the system may provide a warning for action before any damage occurs to the power lines, such as to turn off the power lines or immediately put out the fire. Further, IR sensors and bolometers may enable fire detection during night hours, when it is most difficult to detect and could grow out of control completely unnoticed due to human absence and watch during night. When deployed over wide area power lines, the system of the present invention also constitutes a wide-area fire surveillance system, providing persistent monitoring and prompt reporting of fire activity in a coverage area. This feature is extremely critical for attacking wildfires as soon as they start, for quick and effective control and extinction before the fires grow out of control over a large area.

According to embodiments, each sensor node of the system will have a unique identification, which will allow it to specify exact location of the origin of an event warning for quick response and handling.

The electrical power line mounted fire warning system according to embodiments of the present invention has multiple redundant channels communication capability. Primary communication may be via physical power cables, through sending a modulated signal, delivered at the end of each line span, generating a warning signal when a fire is detected. At the receiving end, a modem device may be provided to listen to signals coming from all directions from power lines. Signals may have information related to actual fire condition, time stamp, and location of the originating sensor node. Power cables may provide a robust medium of sending signals, as long as the power cables are not broken.

Additionally, according to an embodiment, a long-range, low-power wireless system technology, LoRa (Long Range) may be employed in the electrical power line mounted fire warning system. For example, RFM LoRa Shield is an Arduino shield which integrates RFM95W LoRa module and based on Open Source Library with any Arduino projects, and is compatible with Arduino/Genuino/CT Uno, Arduino/Genuino Mega2560, Arduino Leonardo and possibly other pin compatible main boards. In an embodiment, LoRa may be implemented on each of the sensor nodes for hoping communication in both directions of the cable line. Since it is extremely low power, it may continue to transmit a warning signal even after it had fallen on the ground, such as when the cables break. Hopping signals on the sensor nodes could deliver a warning signal to the end of the power line at a substation or a power distribution station. Long range Wi-Fi transmission of the warning could be directly sent to fire stations and a power substation from devices mounted on power line poles in the vicinity. In an embodiment, an additional communication link could be implemented using direct satellite link units installed on power line poles at every 10 to 20 miles distance, for example, to take the signal from LoRa and transmit through satellite link to nearby fire stations or electric substations for immediate attention to fires. In an embodiment, fire stations and other authority locations may be equipped with satellite listening devices, continuously listening for any warnings of fire occurrence or potential fire starting condition. In a further embodiment, warning signals could also be directly sent to cell phones of first respondents and firefighters via cell towers. In a further embodiment, communication links using other wireless EMF technologies could be utilized to the same effect.

With further reference to FIGS. 1 to 4, a microcontroller and sensor processing will be described. Software run on the microcontroller and communication control devices may be configured for initializing the sensors, self-testing for calibration and functionality verification and for communication channel initialization, transmit and receive functions, and validation. The software will operate on microcontrollers, serving different hierarchy of control and functionality. In an embodiment, a main system microcontroller may be supported by one or more other microcontrollers, handling different parts of the system (e.g., sensor initialization, sensor signal pooling, data fusion, and reporting). A communication microcontroller may receive commands from a main controller and execute communication functions. The software may have robustness to reconfigure control resources, in case of a failure of a hardware component. Under the software architecture, any microcontroller could take up main system controller responsibility, after reconfiguration to avoid a single point of failure and total system failures. Further, the software may be designed for secure operation, with high protection for impenetrability by intruders. Communication channels may be secured with limited access by a systems operator only. Periodic software updates may be provided through system-wide broadcast, involving specific or all listening sensor nodes. Further, a comprehensive system status may be pinged periodically to avoid lapses in response to fires.

A functionality of the sensor node including the microcontroller according to one or more embodiments will now be described further. In one or more embodiments, a real time dock times operational modes of the sensors, including day, date, and time. All sensors may be initialized, and an initial reading, range check, and overall condition determination may be performed. In an embodiment, an IR sensor and an accelerometer may be the first two sensors to be powered up. A determination of which sensors need to be powered up for monitoring under a specific condition may be made. Powering up sensors, waiting for stability, and comparing measurements for stable operation may be performed. Then, once data acquisition is completed, the sensors may be turned off until a next cycle of measurements.

According to one or more embodiments, sensors may be polled for data sequentially, and a range of data for each against lookups may be checked. If data is out of range for a sensor, power management and distribution (PMAD) may be commanded to initialize that sensor through power cycling. If data is acceptable, it may be combined in a pre-established order to determine severity of a condition. If additional data is needed from off sensors, the PMAD may command to turn them on and repeat. Severity of conditions may be compared with a previous measured cycle, and next steps may be determined. If conditions meet an event threshold, a warning signal generator may be commanded with latest measured data to proceed. Data from all sensors may be combined in a specified sequence to determine a prevailing condition and then compared with a previous cycle to determine progression in terms of increased or diminished severity of an event.

In an embodiment, if a fire condition is concluded, a communication module is commanded to initiate dialogue with two neighboring (e.g., nearest) sensor nodes to positively verify existence of the condition. If a fire condition is confirmed with the two neighboring sensor nodes, the communication module may be commanded to initiate transmission of warning signal via all channels.

In an embodiment, if sparking/arching and/or unusual current swing is identified on the electrical power line, the communication module may be commanded to transmit a warning signal.

In an embodiment, a fire existence condition may be verified with two neighboring sensor nodes, upon receiving a command. Then, open cell tower and/or satellite communication may be performed, and transmission directly and/or via neighboring sensor nodes may be performed. A modulated signal may be transmitted on a power line intermittently, when a fire detected. Once the fire existence is verified, the system may continue transmitting a warning signal on all channels. During night time, if fire existence is verified, the system may continue transmitting a warning signal on all channels.

In an embodiment, a fault magnitude that is determined or calculated is compared with a specified range to determine the existence of actual fault which may result in fire danger during certain weather conditions. A signal may be generated to load on the line with identification, which would lead to the location of the fault event. In an embodiment, a warning signal may be continuously or periodically sent over the power line until acknowledged from the listening end.

In embodiments, in standby mode, each of the sensor nodes would respond to a ping request from one or more base stations with a unique identification and health status. Further, in an embodiment, a sensor node watchdog may allow a sensor node to reset itself if there is a problem with the control software. The numerous sensor nodes result in a distributed data collection and processing system that is highly fault tolerant, providing graceful degradation of the overall system performance to multiple faults. Further, the sensor nodes may be configurable via parameter upload or full firmware update, and the ability to reconfigure node resources through software allows the node to be configured for multiple sensor functions. These functions could be static (pre-programmed) or dynamically altered during operation to accommodate real-time adaptability and fault tolerance. Base stations may utilize fault-tolerant hardware (e.g., use of triple module redundancy, i.e., TMR) with uninterruptable power sources and software that is fault tolerant against failure due to soft errors (e.g., single event upsets, i.e., SEUs) and use of watchdog timers, and multiprocessing with voting.

Figure 5A:
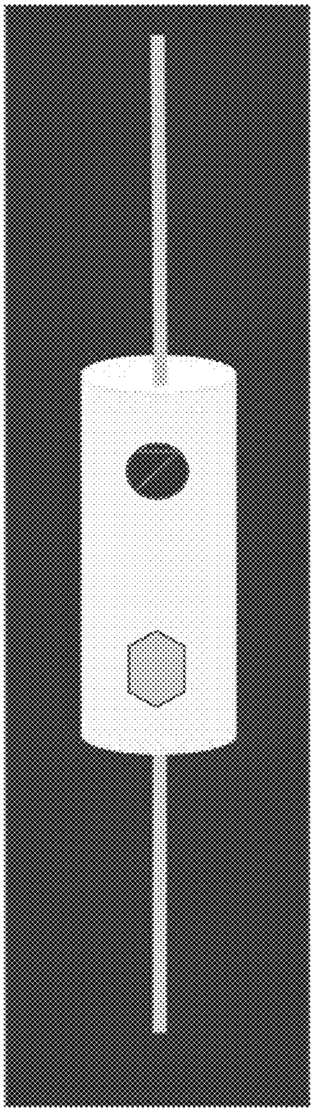
FIGS. 5A and 5B are schematic views illustrating some examples of a housing of a sensor node of an electrical power line mounted fire warning system, according to one or more embodiments of the present invention.
Figure 5B:
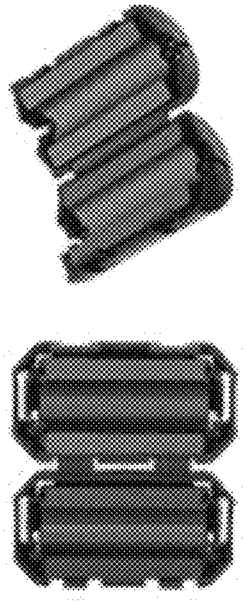
Figure 6A:
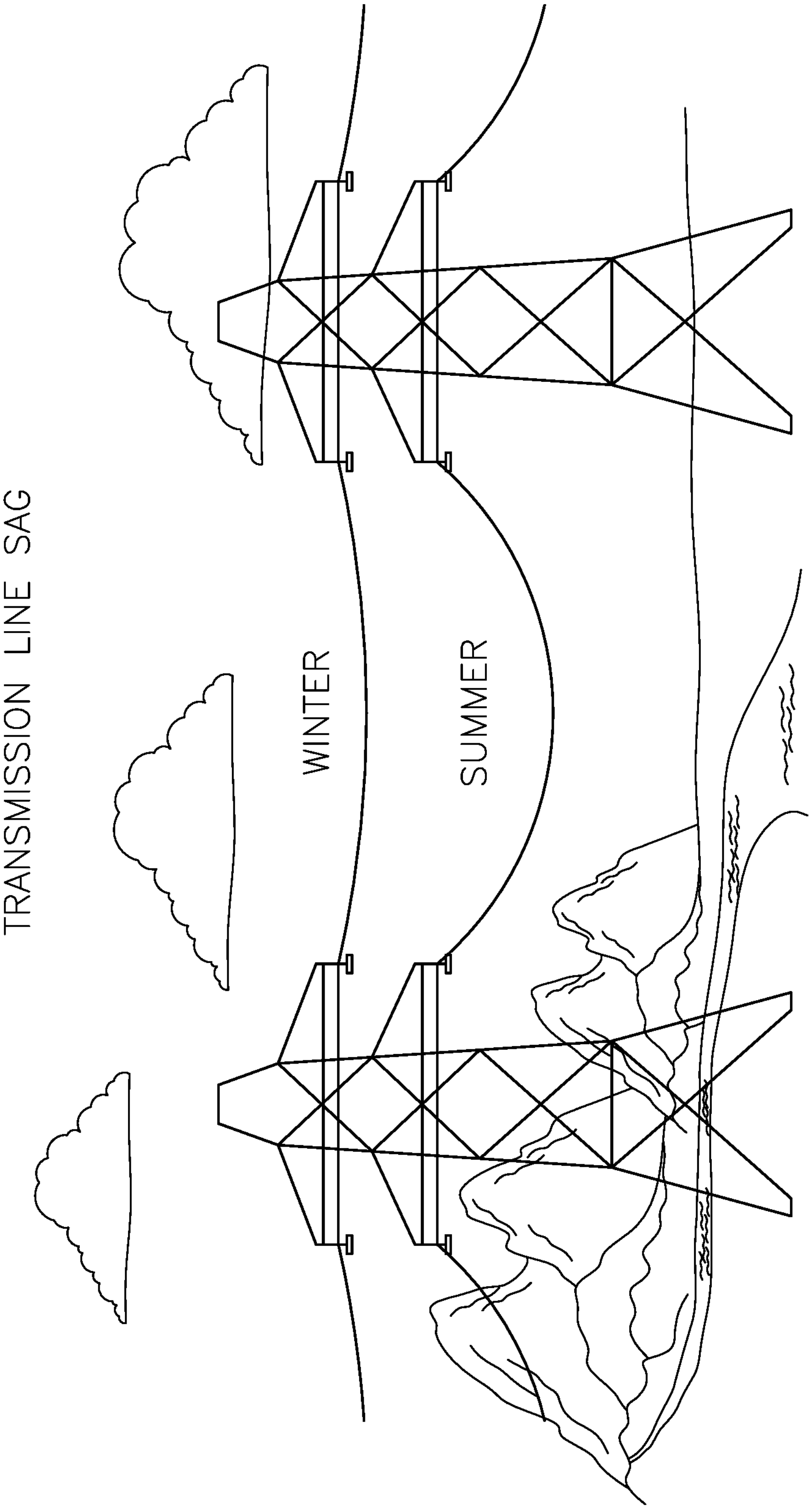
FIGS. 6A and 6B are schematic views illustrating sag and swaying of electrical power lines.
Figure 6B:
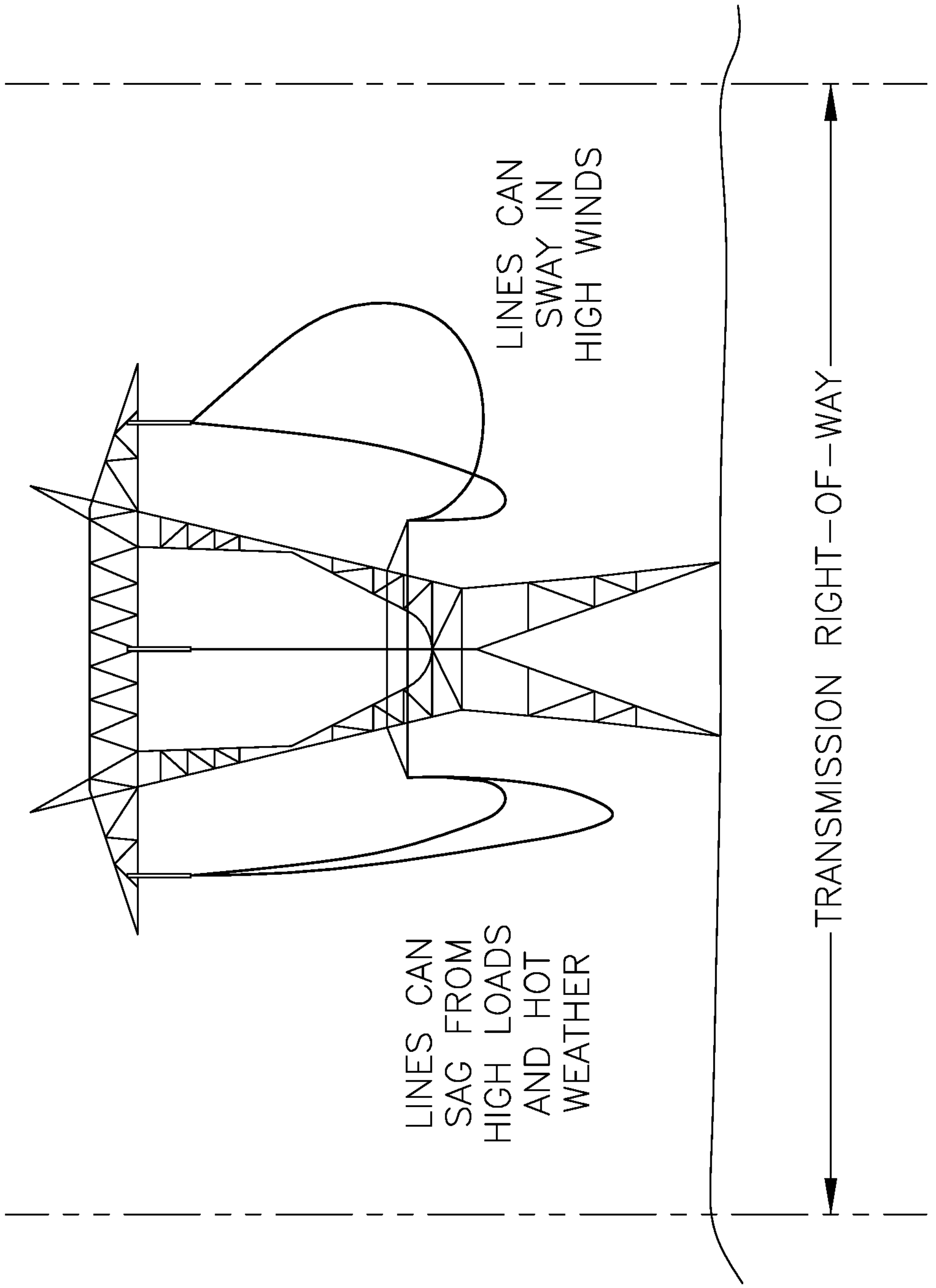

FIGS. 5A and 5B are schematic views illustrating some examples of a housing of a sensor node of an electrical power line mounted fire warning system, according to one or more embodiments of the present invention. The sensor node shown in FIG. 5A includes a housing that is coupled to or supported by (e.g., directly coupled to or supported by) an electrical power line. For example, the sensor node may include a housing having two portions (e.g., two halves) configured to clamp onto an electrical power line, similar to ferrite chokes, as shown in FIG. 5B. In one example embodiment, the sensor node may be cylindrical in shape and may have a length of about 18 inches and a diameter of about 6 inches. The sensor node may include a waterproof housing including windows through which the sensors may detect light, heat, etc. In another embodiment, for example, the sensor node may include a housing configured to be mounted to an electrical power line as described in U.S. Pat. No. 9,784,766, owned by Lindsey Manufacturing Company.

Figure 7:
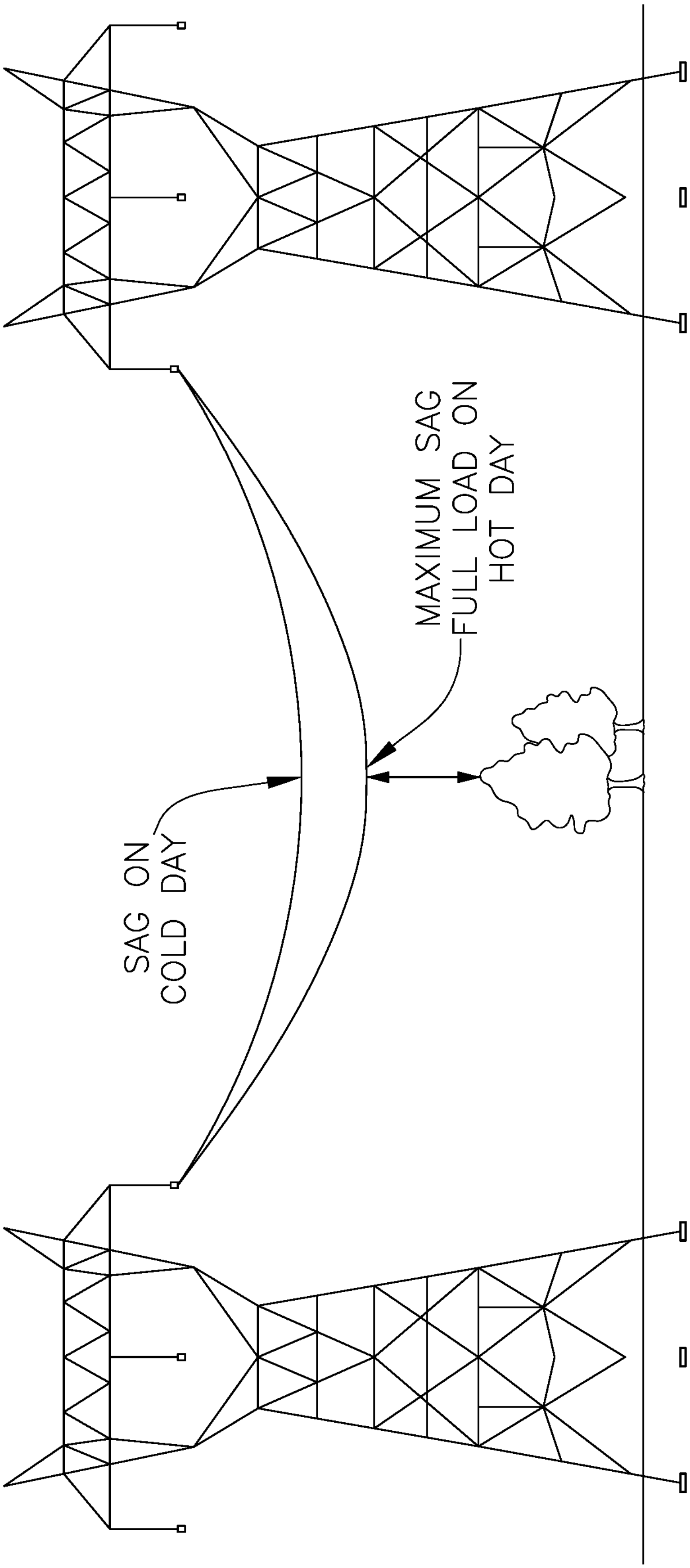
FIG. 7 is a schematic view illustrating sag and clearance of electrical power lines from an object.

In one or more embodiments, the sensor node may be coupled to a region of the electrical power line that has a lowest point of an arch, or a maximum sag (see, e.g., FIG. 7). For example, as illustrated in FIG. 7, a clearance may exist between the lowest point and an object, such as a tree.

In some locations, where heavy vehicles could drive under the electrical power lines, the sensor node could be easily snapped onto the power line by an insulated mechanical robotic arm, for example, without turning off the power through the power line. In an embodiment, if the terrain under the power line is too rough for driving a vehicle, for example, a customized drone (quad rotor) could install the sensor node on an electrical power line without interfering with power line operation. Similarly, if a sensor node or system unit needed replacement for any reason, the drone cold be employed for quick and easy replacement.

According to embodiments of the present invention, the sensor node contains all of the electronics needed to support the interfacing needs of its local sensors as well as providing local data processing and storage, and inter-node communication. Further, the sensor node may have low power consumption. Additionally, a ratio of analog resolution to data rates of sensor outputs may be adjustable to accommodate noisy environments or power supply limitations.

In an embodiment, the sensor node may be inductively powered by current passing through the electrical power line to which the sensor node is coupled, such that the sensor node does not require a dedicated power supply. In an embodiment, the sensor node may be self-powered through the harvesting of energy from near-field coupling with powered transmission lines, and may further include chargeable energy storage for emergency loss of energy sources (e.g., a line is unpowered at night or in a damaged condition).

Each of the sensor nodes includes one or more sensors that may include, but are not limited to, a wide-field IR detector and/or a bolometer to support fire detection, an EM detector to support detection of line shorting (e.g., sparks, arching, current surges, instantaneous current direction changes, intermittent line shorts), a humidity sensor to detect dry weather, a light sensor, a temperature sensor, a smoke detector to detect an existing fire, and an accelerometer to detect swaying of an electrical power line, such as in high-wind conditions. The sensor nodes may further include a camera, such as a wide-field camera, which may be configured to provide standby-mode low frame rate captures, and high frame rate triggered by an event, such as high IR or EM detection.

Further, aspects and effects of embodiments of the present invention are not limited to those described herein. For example, embodiments of the present invention may be used for early detection of fire or fire risk in applications other than electrical power lines. For example, a space-rated version of such a system could be used in exploration with variation of sensors required by a specific space mission or in a space station. A space version of this system could provide in-situ fire prediction and monitoring device for safety and avoiding accidents. Further, for example, an embodiment of the present invention could provide a dropped, distributed sensor system for exploration on solar system bodies, where landing may not be possible.

Although the drawings and accompanying description illustrate certain example embodiments of the present invention, it will be apparent that the novel aspects of the present invention may also be carried out by utilizing alternative structures, sizes, shapes, and/or materials in embodiments of the present invention. Also, in other embodiments, components described above with respect to one embodiment may be included together with or interchanged with those of other embodiments. Accordingly, persons skilled in the art and technology to which this invention pertains will appreciate that alterations and changes in the described structures and methods of operation can be practiced without meaningfully departing from the principles, spirit, and scope of this invention.

What is claimed is:

1. An overhead electrical power line mounted wildfire warning system comprising:

a plurality of sensor nodes, each comprising:

a housing mountable on an overhead electrical power line;

one or more sensors supported by the housing and comprising an IR sensor and/or a bolometer to detect a wildfire in a vicinity of the overhead electrical power line;

a microcontroller configured to determine existence of a wildfire or a wildfire risk based on one or more parameters detected by the one or more sensors; and a communication device configured to send a signal away from the sensor node when the microcontroller determines existence of a wildfire or a wildfire risk, wherein the communication device is configured to send the signal to a neighboring sensor node of the plurality of sensor nodes, and the neighboring sensor node is configured to receive the signal and verify the existence of a wildfire or a wildfire risk.

2. The overhead electrical power line mounted wildfire warning system of claim 1, wherein each of the plurality of sensor nodes further comprises an electromagnetic sensor to detect at least one of a spark, a current surge of the overhead electrical power line, or a line short of the overhead electrical power line.

3. The overhead electrical power line mounted wildfire warning system of claim 1, wherein each of the plurality of sensor nodes further comprises a camera.

4. The overhead electrical power line mounted wildfire warning system of claim 1, wherein the one or more sensors further comprises a temperature sensor.

5. The overhead electrical power line mounted wildfire warning system of claim 1, wherein the one or more sensors further comprises an accelerometer.

6. The overhead electrical power line mounted wildfire warning system of claim 1, further comprising a monitoring station, wherein the communication device is configured to send the signal to the monitoring station.

7. The overhead electrical power line mounted wildfire warning system of claim 1, wherein each of the plurality of sensor nodes is configured to be powered from the overhead electrical power line.

8. The overhead electrical power line mounted wildfire warning system of claim 1, wherein the one or more sensors further comprises a humidity sensor.

9. The overhead electrical power line mounted wildfire warning system of claim 1, wherein the one or more sensors further comprises a light sensor.

10. The overhead electrical power line mounted wildfire warning system of claim 1, wherein the one or more sensors further comprises a smoke detector.

11. The overhead electrical power line mounted wildfire warning system of claim 1, wherein the housing comprises two portions configured to clamp onto the overhead electrical power line.

12. The overhead electrical power line mounted wildfire warning system of claim 1, wherein the microcontroller is configured to determine existence of a wildfire or a wildfire risk based on the one or more parameters detected by the one or more sensors and a comparison thereof with one or more parameters previously detected by the one or more sensors.

13. A method of monitoring and providing a wildfire warning, the method comprising:

providing a plurality of sensor nodes, each comprising:

a housing mountable on an overhead electrical power line;

one or more sensors supported by the housing and comprising an IR sensor and/or a bolometer to detect a wildfire in a vicinity of the overhead electrical power line;

a microcontroller configured to determine existence of a wildfire or a wildfire risk based on one or more parameters detected by the one or more sensors; and a communication device configured to send a signal away from the sensor node when the microcontroller determines existence of a wildfire or a wildfire risk, wherein the communication device sends the signal to a neighboring sensor node of the plurality of sensor nodes when the microcontroller determines existence of a wildfire or a wildfire risk, and the neighboring sensor node receives the signal; and mounting the plurality of sensor nodes on one or more overhead electrical power lines.

14. The method of claim 13, wherein each of the plurality of sensor nodes further comprises an electromagnetic sensor to detect at least one of a spark, a current surge of the overhead electrical power line, or a line short of the overhead electrical power line.

15. The method of claim 13, wherein each of the plurality of sensor nodes further comprises a camera.

16. The method of claim 13, wherein the one or more sensors further comprises a temperature sensor.

17. The method of claim 13, wherein the one or more sensors further comprises an accelerometer.

18. The method of claim 13, wherein the communication device sends the signal to a monitoring station when the microcontroller determines existence of a wildfire or a wildfire risk.

19. The method of claim 13, wherein at least one of the plurality of sensor nodes is mounted on the overhead electrical power line at a lowest point of an arch of the overhead electrical power line.

20. The method of claim 13, wherein, when the microcontroller determines existence of a wildfire or a wildfire risk, the communication device sends the signal until acknowledged from a listening end.

21. The method of claim 13, wherein, when the microcontroller determines existence of a wildfire or a wildfire risk, the communication device sends the signal along the overhead electrical power line.

22. The method of claim 13, wherein the microcontroller is configured to determine existence of a wildfire or a wildfire risk based on the one or more parameters detected by the one or more sensors and a comparison thereof with one or more parameters previously detected by the one or more sensors.

23. A sensor device comprising:

a housing mountable on or in proximity of an overhead electrical power line, wherein the housing is mounted on or adjacent to a power pole or a transformer;

one or more sensors supported by the housing and comprising an IR sensor and/or a bolometer to detect a wildfire in a vicinity of the overhead electrical power line;

a microcontroller configured to determine existence of a wildfire or a wildfire risk based on one or more parameters detected by the one or more sensors; and a communication device configured to send a signal away from the sensor device when the microcontroller determines existence of a wildfire or a wildfire risk, wherein the communication device is configured to send the signal to a neighboring sensor device to receive the signal and verify the existence of a wildfire or a wildfire risk.

24. The sensor device of claim 23, wherein the one or more sensors further comprises an electromagnetic sensor to detect at least one of a spark, a current surge of the overhead electrical power line, or a line short of the overhead electrical power line.

25. The sensor device of claim 23, wherein the housing is waterproof and comprises one or more windows through which the one or more sensors are configured to detect light and/or heat.

26. The sensor device of claim 23, wherein the microcontroller is configured to determine existence of a wildfire or a wildfire risk based on the one or more parameters detected by the one or more sensors and a comparison thereof with one or more parameters previously detected by the one or more sensors.

27. A wildfire warning system comprising:

a plurality of sensor nodes, each comprising:

a housing mountable on an electrical power pole or by a transformer;

one or more sensors supported by the housing and comprising an IR sensor and/or a bolometer to detect a wildfire in a vicinity of the electrical power pole or transformer;

a microcontroller configured to determine existence of a wildfire or a wildfire risk based on one or more parameters detected by the one or more sensors; and a communication device configured to send a signal away from the sensor node when the microcontroller determines existence of a wildfire or a wildfire risk, wherein the communication device is configured to send the signal to a neighboring sensor node of the plurality of sensor nodes, and the neighboring sensor node is configured to receive the signal and verify the existence of a wildfire or a wildfire risk.

28. The wildfire warning system of claim 27, wherein the plurality or sensors further comprises an electromagnetic sensor configured to detect disturbances on a power line.

29. The wildfire warning system of claim 27, wherein each of the plurality of sensor nodes further comprises an electromagnetic sensor to detect a spark of an overhead electrical power line or the transformer.

30. The wildfire warning system of 24, wherein each of the plurality of sensor nodes further comprises a camera.

31. The wildfire warning system of claim 27, wherein the one or more sensors further comprises a temperature sensor.

32. The wildfire warning system of claim 27, further comprising a monitoring station, wherein the communication device is configured to send the signal to the monitoring station.

33. The wildfire warning system of claim 27, wherein the one or more sensors further comprises a humidity sensor.

34. The wildfire warning system claim 27, wherein the one or more sensors further comprises a light sensor.

35. The wildfire warning system of claim 27, wherein the one or more sensors further comprises a smoke detector.

36. The wildfire warning system of claim 27, wherein the housing is waterproof and comprises one or more windows through which the one or more sensors are configured to detect light and/or heat.

37. The wildfire warning system of claim 27, wherein the microcontroller is configured to determine existence of a wildfire or a wildfire risk based on the one or more parameters detected by the one or more sensors and a comparison thereof with one or more parameters previously detected by the one or more sensors.

* * * * *